United States Patent
Kagami

(10) Patent No.: US 12,444,815 B2
(45) Date of Patent: *Oct. 14, 2025

(54) SECONDARY BATTERY

(71) Applicant: TOYOTA JIDOSHA KABUSHIKI KAISHA, Toyota (JP)

(72) Inventor: Ryo Kagami, Ichinomiya (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/385,034

(22) Filed: Oct. 30, 2023

(65) Prior Publication Data

US 2024/0063515 A1 Feb. 22, 2024

Related U.S. Application Data

(63) Continuation of application No. 17/481,696, filed on Sep. 22, 2021, now Pat. No. 11,843,132.

(30) Foreign Application Priority Data

Sep. 24, 2020 (JP) ................. 2020-159666

(51) Int. Cl.
*H01M 50/553* (2021.01)
*H01M 50/105* (2021.01)
(Continued)

(52) U.S. Cl.
CPC ....... *H01M 50/553* (2021.01); *H01M 50/105* (2021.01); *H01M 50/178* (2021.01); *H01M 50/474* (2021.01); *H01M 50/55* (2021.01)

(58) Field of Classification Search
CPC ....... H01M 2300/0068; H01M 50/186; H01M 50/533; H01M 50/54; H01M 50/557;
(Continued)

(56) References Cited

U.S. PATENT DOCUMENTS 6,001,505 A * 12/1999 Fukuda ............. H01M 10/0436
429/324
2009/0159354 A1 * 6/2009 Jiang .................. H01M 50/581
180/68.5

(Continued)

FOREIGN PATENT DOCUMENTS

JP 5550805 B2 7/2014
JP 2014-531111 A 11/2014
JP 2018129153 A * 8/2018

OTHER PUBLICATIONS

English translation of JP2018129153A (Year: 2018).*
U.S. Appl. No. 17/481,696, filed Sep. 22, 2021, Ryo Kagami.

*Primary Examiner* — Ula C Ruddock
*Assistant Examiner* — Sarika Gupta
(74) *Attorney, Agent, or Firm* — Dinsmore & Shohl LLP

(57) ABSTRACT

The present disclosure is to suppress the scratching of or damage to an exterior body or current collectors caused by displacement of terminals connected to electrode bodies when a battery expands or contracts. The displacement of terminals when a battery expands or contracts is prevented by arranging the protruding positions of the terminals side by side with at least one of a positive electrode terminal and a negative electrode terminal formed in a crank-like shape, and supporting the positive electrode terminal and the negative electrode terminal by a holder.

12 Claims, 13 Drawing Sheets

(51) Int. Cl.
  *H01M 50/178* (2021.01)
  *H01M 50/474* (2021.01)
  *H01M 50/55* (2021.01)

(58) Field of Classification Search
  CPC .. H01M 50/586; H01M 50/59; H01M 50/543; H01M 50/528; H01M 50/552; H01M 10/0562; Y02P 70/50
  See application file for complete search history.

(56) References Cited

U.S. PATENT DOCUMENTS

| | | | |
|---|---|---|---|
| 2009/0305134 A1 | 12/2009 | Ryu | |
| 2011/0129707 A1 | 6/2011 | Ahn et al. | |
| 2011/0287301 A1* | 11/2011 | Kim | H01M 50/463 |
| | | | 429/160 |
| 2014/0106193 A1 | 4/2014 | Kim et al. | |
| 2019/0363316 A1* | 11/2019 | Lee | H01M 50/531 |
| 2019/0379032 A1* | 12/2019 | Park | H01M 50/595 |
| 2020/0136121 A1 | 4/2020 | Allen et al. | |

* cited by examiner

ONE SIDE ←——→ OTHER SIDE
LAMINATION DIRECTION

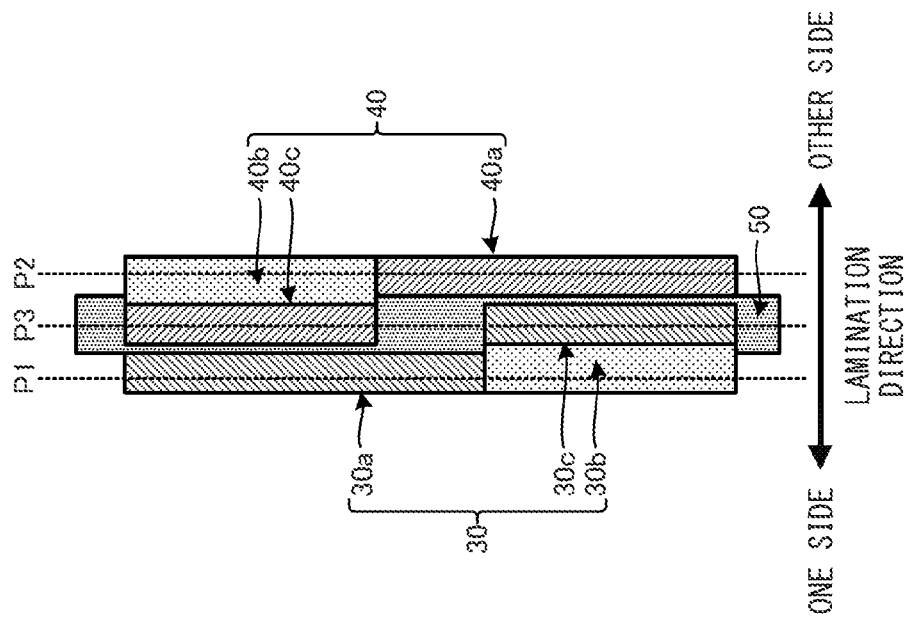
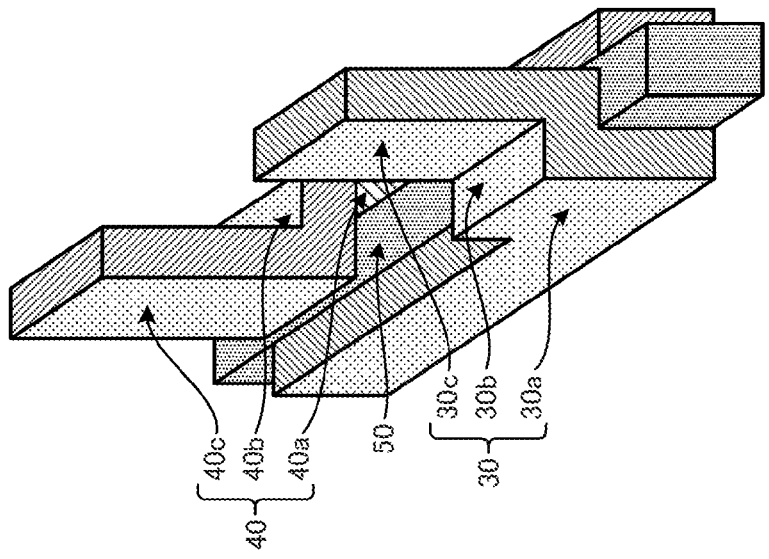

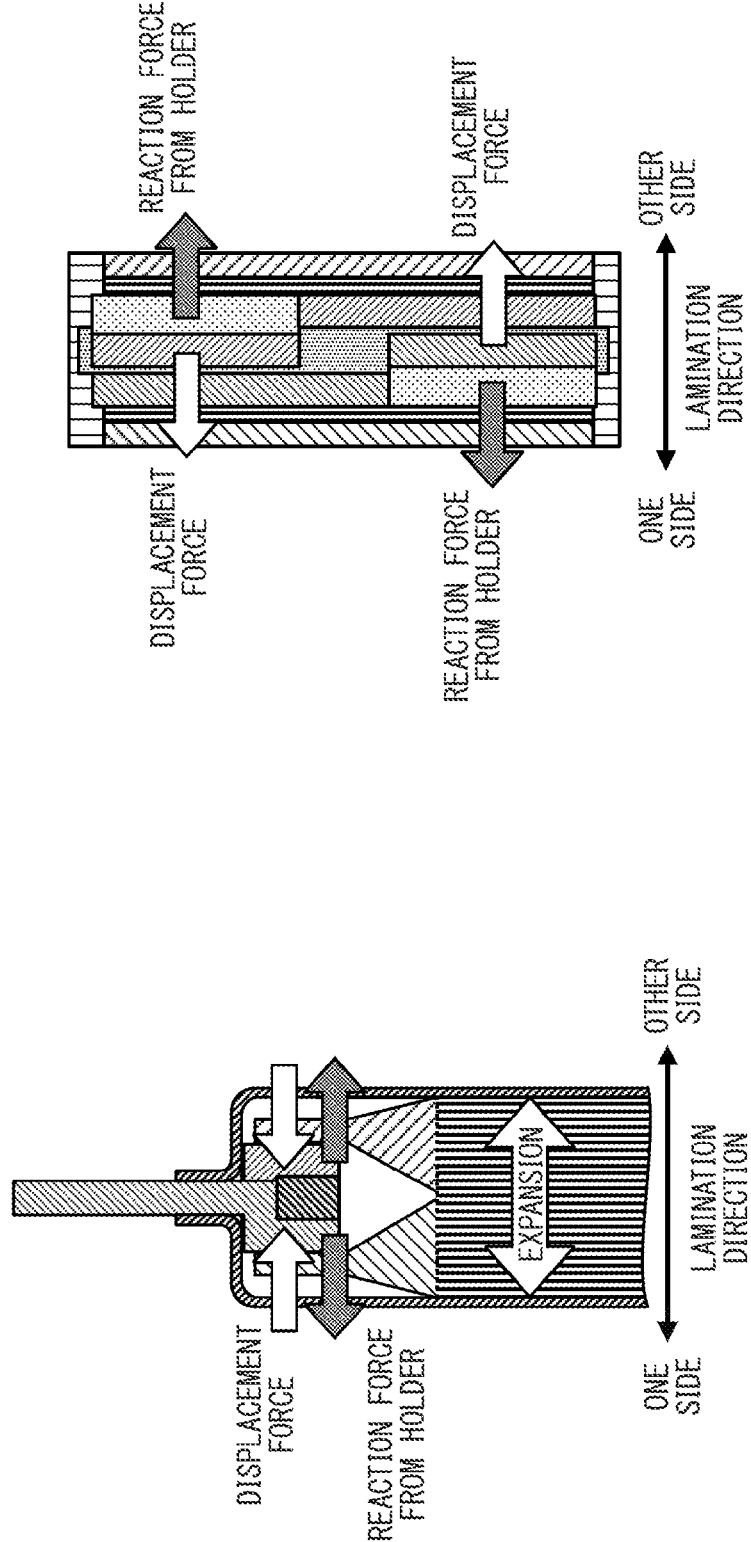

SECONDARY BATTERY

CROSS-REFERENCE TO RELATED APPLICATIONS

This application is a continuation of U.S. patent application Ser. No. 17/481,696 filed Sep. 22, 2021, which claims priority to Japanese Patent Application No. 2020-159666 filed Sep. 24, 2020, which is incorporated herein by reference in its entirety including the specification, drawings and abstract.

FIELD

The present disclosure relates to a secondary battery.

BACKGROUND

Japanese Patent No. 5550805 discloses a technology of a secondary battery comprising a plurality of laminated electrode bodies, wherein leads are welded to current collectors. In Japanese Patent No. 5550805, a positive electrode lead welded to a positive electrode current collector and a negative electrode lead welded to a negative electrode current collector have substantially the same shape and are both flat plates. Japanese Unexamined PCT Publication (Kohyo) No. 2014-531111 discloses a technology of a pouch-type secondary battery, wherein a positive electrode terminal and a negative electrode terminal are bent into the same shape and are housed in a pouch.

SUMMARY

Technical Problem

In secondary batteries comprising a plurality of laminated electrode bodies, when charging/discharging a battery, for example, expansion and contraction are likely to occur in the lamination direction of the electrode body. According to new findings of the present inventors, when the battery expands or contracts, the terminals connected to the electrode bodies are likely to be displaced in the lamination direction of the electrode bodies, whereby forces can easily be exerted from the terminals to the exterior body or the current collectors. There are concerns regarding scratching of or damage to the exterior body or current collectors when forces are applied from the terminals to the exterior body or the current collectors.

Solution to Problem

As one aspect for solving the above problems, the present disclosure provides:
  a secondary battery, comprising an exterior body, an electrode laminate, a first terminal, a second terminal, and a holder, wherein
  the exterior body houses the electrode laminate,
  the electrode laminate has a laminate part and a current collection part,
  the laminate part has a plurality of laminated electrode bodies,
  the current collection part has at least one positive electrode current collector and at least one negative electrode current collector which protrude from the laminate part,
  the first terminal has a first connection part, a first crank-shaped part, and a first protrusion,
  the second terminal has a second connection part and a second protrusion,
  the first connection part is connected to one of the positive electrode current collector and the negative electrode current collector,
  the second connection part is connected to the other of the positive electrode current collector and the negative electrode current collector,
  the first connection part is provided on one lamination direction side of the plurality of electrode bodies with respect to the second connection part,
  the second connection part is provided on the other lamination direction side of the plurality of electrode bodies with respect to the first connection part,
  the first crank-shaped part couples (connects) the first connection part and the first protrusion,
  the first crank-shaped part is bent from the first connection part toward the other lamination direction side,
  the first protrusion and the second protrusion protrude to the outside of the exterior body,
  the first protrusion and the second protrusion do not face each other in the lamination direction,
  when a first plane orthogonal to the lamination direction and transecting the first connection part and a second plane orthogonal to the lamination direction and transecting the second connection part are assumed, the first protrusion is positioned between the first plane and the second plane or the second plane transects the first protrusion, and the second protrusion is positioned between the first plane and the second plane or the second plane transects the second protrusion, and
  the holder contacts the first terminal and the second terminal and supports the first terminal and the second terminal.
In the secondary battery of the present disclosure:
the second terminal may have a second crank-shaped part,
the second crank-shaped part may couple (connect) the second connection part and the second protrusion,
the second crank-shaped part may be bent from the second connection part toward the one lamination direction side,
the first crank-shaped part and the second-crank shaped part may not face each other in the lamination direction, and
the first protrusion and the second protrusion may be positioned between the first plane and the second plane.
In the secondary battery of the present disclosure:
the exterior body may be composed of a laminate film,
the exterior body may comprise a seal part, and
the first protrusion and the second protrusion may protrude through the seal part to outside of the exterior body.
In the secondary battery of the present disclosure:
the current collection part may have a plurality of the positive electrode current collectors and a plurality of the negative electrode current collectors which protrude from the laminate part,
the plurality of positive electrode current collectors may be connected to each other to form a first terminal connection part,
the plurality of negative electrode current collectors may be connected to each other to form a second terminal connection part,
the first connection part may be connected to one of the first terminal connection part and the second terminal connection part, and the second connection part may be connected to the other of the first terminal connection part and the second terminal connection part.

In the secondary battery of the present disclosure: at least a part of the first connection part and at least a part of the second connection part may face each other in the lamination direction.

In the secondary battery of the present disclosure: when a third plane orthogonal to the lamination direction and transecting the first protrusion is assumed, the third plane may transect the second protrusion.

In the secondary battery of the present disclosure: the holder may be provided inside the exterior body between the electrode laminate and an inner surface of the exterior body.

In the secondary battery of the present disclosure: the holder may be present at least between the first plane and the second plane, and the holder may contact the first connection part and the second connection part.

In the secondary battery of the present disclosure: the holder may be composed of a thermoplastic resin or a curable resin.

The secondary battery of the present disclosure may be an all-solid-state battery.

Effects

In the secondary battery of the present disclosure, since the first terminal and the second terminal are supported by the holder, the force from the first terminal and the force from the second terminal can easily offset each other via the holder. Furthermore, since the first terminal has a shape which is bent to the second terminal side in the lamination direction of the electrode bodies, the position of the first protrusion and the position of the second protrusion in the lamination direction can be brought close to each other, the outer body can easily be sealed, and the strength in the seal part can easily be increased. As described above, according to the secondary battery of the present disclosure, even when the battery expands or contracts, scratching of or damage to the exterior body or the current collectors can easily be suppressed due to the shape of the terminals and the presence of the holder.

BRIEF DESCRIPTION OF DRAWINGS

FIG. 3 shows the secondary battery of FIG. 1 as viewed from above, and the exterior body has been omitted.

FIG. 9A schematically shows a perspective view of an example of the structure of a terminal supported by the holder.

FIG. 9B schematically shows a plan view of FIG. 9A as viewed from above.

FIG. 12A shows a cross-sectional schematic view of the secondary battery of the present disclosure and shows the problem-solving mechanism of the secondary battery of the present disclosure.

FIG. 12B shows a schematic plan view of the secondary battery of FIG. 12(A) as viewed from above, and in which the exterior body has been omitted.

DESCRIPTION OF EMBODIMENTS

Figure 1:
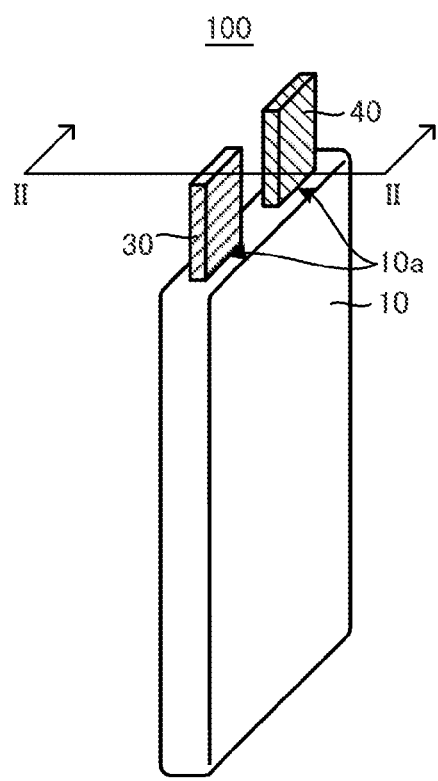
FIG. 1 schematically shows an example of the shape of a secondary battery.

As shown in FIGS. 1 to 9, a secondary battery 100 comprises an exterior body 10, an electrode laminate 20, a first terminal 30, a second terminal 40, and a holder 50. The exterior body 10 houses the electrode laminate 20. The electrode laminate 20 has a laminate part 20a and a current collection part 20b. The laminate part 20a has a plurality of laminated electrode bodies 21, and the current collection part 20b has at least one positive electrode current collector 22 and at least one negative electrode current collector 23 which protrude from the laminate part 20a. The first terminal 30 has a first connection part 30a, a first crank-shaped part 30b, and a first protrusion 30c, and the second terminal 40 has a second connection part 40a and a second protrusion 40c. The first connection part 30a is connected to one of the positive electrode current collector 22 and the negative electrode current collector 23, and the second connection part 40a is connected to the other (the current connector which is not connected to the first connection part 30a) of the positive electrode current collector 22 and the negative electrode current collector 23. The first connection part 30a is provided on one lamination direction side of the plurality of electrode bodies 21 with respect to the second connection part 40a, and the second connection part 40a is provided on the other lamination direction side of the plurality of electrode bodies 21 with respect to the first connection part 30a. The first crank-shaped part 30b couples (connects) the first connection part 30a and the first protrusion 30c. The first crank-shaped part 30b is bent from the first connection part 30a toward the other lamination direction side. The first protrusion 30c and the second protrusion 40c protrude to the outside of the exterior body 10. The first protrusion 30c and the second protrusion 40c do not face each other in the lamination direction. When a first plane P1 orthogonal to the lamination direction and transecting the first connection part 30a and a second plane P2 orthogonal to the lamination direction and transecting the second connection part 40a are assumed, the first protrusion 30c is positioned between the first plane P1 and the second plane P2 or the second plane P2 transects the first protrusion 30c. Furthermore, the second protrusion 40c is positioned between the first plane P1 and the second plane P2 or the second plane P2 transects the second protrusion 40c. The holder 50 contacts the first terminal 30 and the second terminal 40 and supports the first terminal 30 and the second terminal 40.

1. Exterior Body

Figure 2:
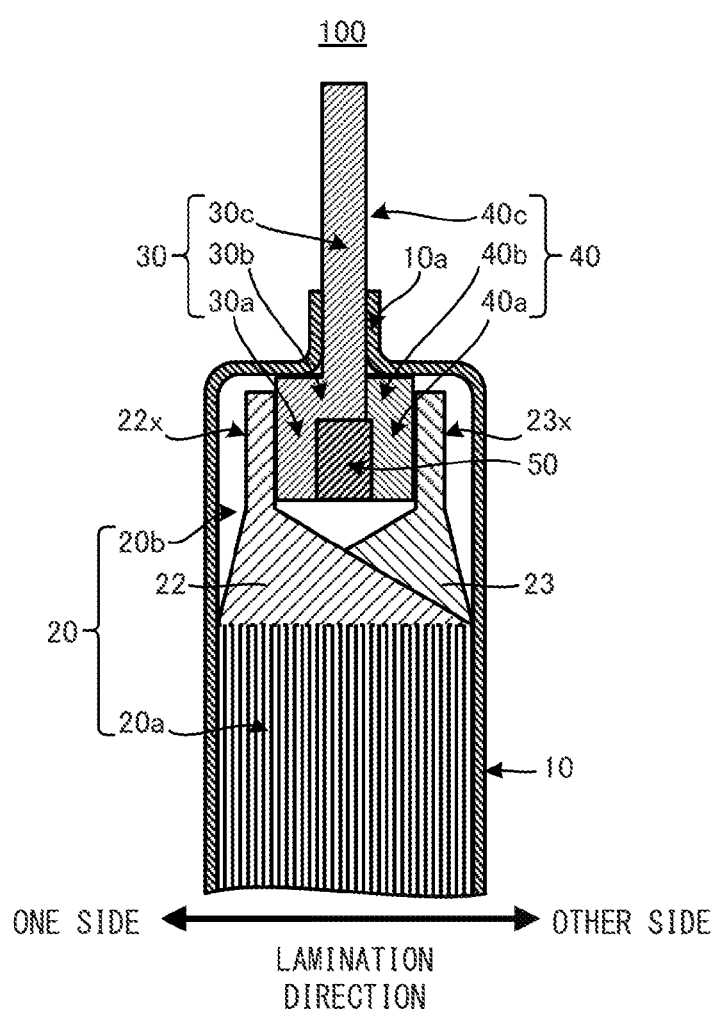
FIG. 2 schematically shows an example of the structure in the cross-section taken along line II-II of FIG. 1 near the portion where a terminal and the current collectors are connected.

As shown in FIGS. 1 and 2, the exterior body 10 houses the electrode laminate 20. Any exterior bodies which are known as the exterior body of a secondary battery can be used as the exterior body 10. The exterior body 10 may be, for example, composed of a laminate film in which a metal foil and a resin film are laminate, or may be a housing such as a metal case. The method of housing the electrode laminate 20 in the laminate film or the housing is not particularly limited. The shape of the exterior body 10 can correspond to the shape of the electrode laminate 20.

Though the problem of scratching of or damage to the exterior body 10 due to deformation of the terminals can occur regardless of the type of the exterior body 10, the problem is likely to occur particularly when a laminate film is used as the exterior body 10. In other words, in the secondary battery 100 of the present disclosure, the exterior body 10 may be composed of a laminate film, and as shown in FIGS. 1 and 2, the exterior body 10 may comprise a seal part 10a, and the first protrusion 30c and the second protrusion 40c may protrude through the seal part 10a to the outside of the exterior body 10. An exterior body composed of a laminate film has low rigidity, and when the terminals are displaced due to expansion or contraction of the battery, peeling of or damage to the seal part is likely to occur. In connection thereto, in the secondary battery 100 of the present disclosure, since deformation of the first terminal 30 and the second terminal 40 is suppressed by the holder 50, peeling or damage to the seal part 10a can be suppressed. Furthermore, in the secondary battery 100 of the present disclosure, since the first terminal 30 has a shape which is bent toward the second terminal 40 side in the lamination direction of the electrode bodies 21, the position of the first protrusion 30c and the position of the second protrusion 40c in the lamination direction can be brought close to each other, whereby the exterior body can easily be sealed. Specifically, for example, the seal part 10a becomes stronger, and peeling of and damage to the seal part 10a can be further suppressed.

2. Electrode Laminate

Figure 3:
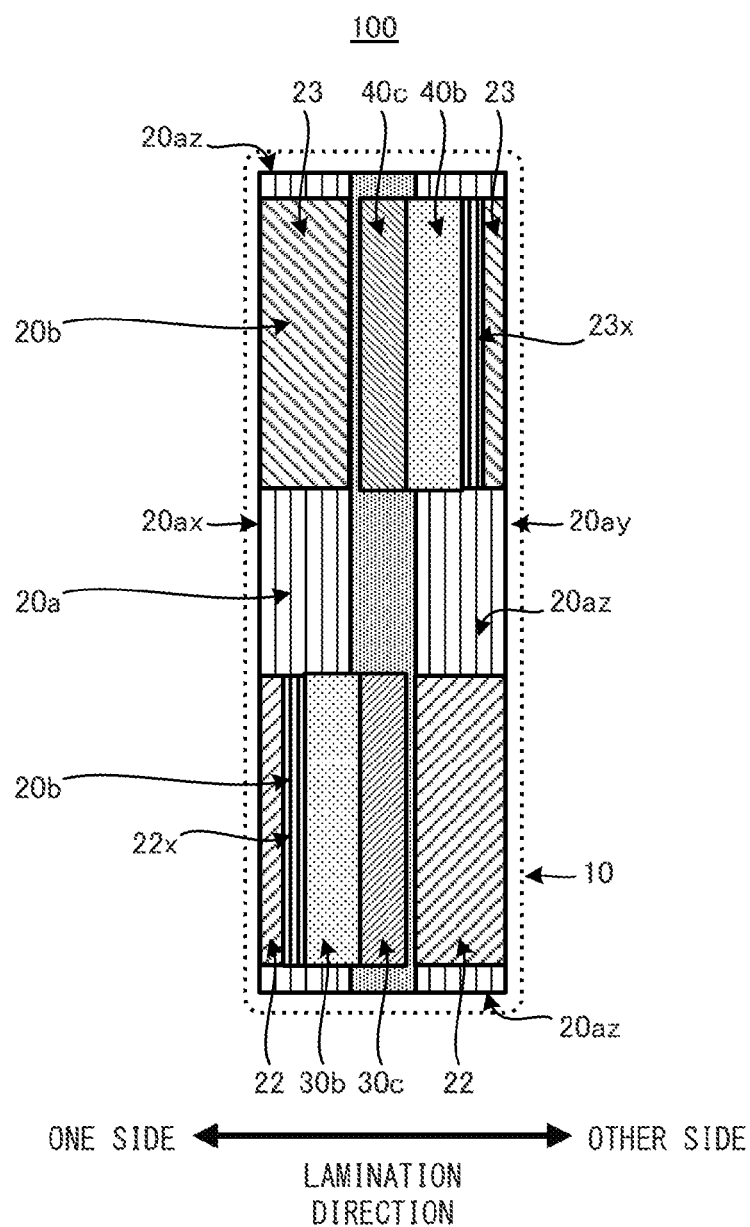
FIG. 3 schematically shows an example of the positional relationship between the terminals, the current collectors, and the holder.
Figure 4:
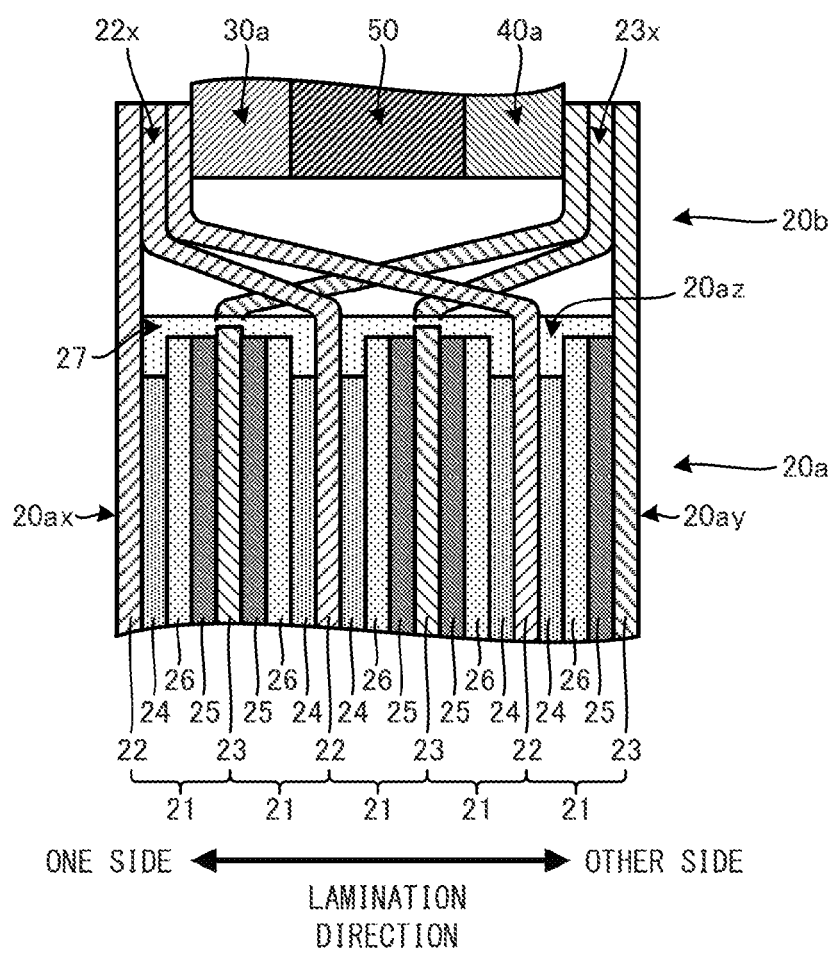
FIG. 4 schematically shows an example of the structure of a cross-section of an electrode laminate.
Figure 5:
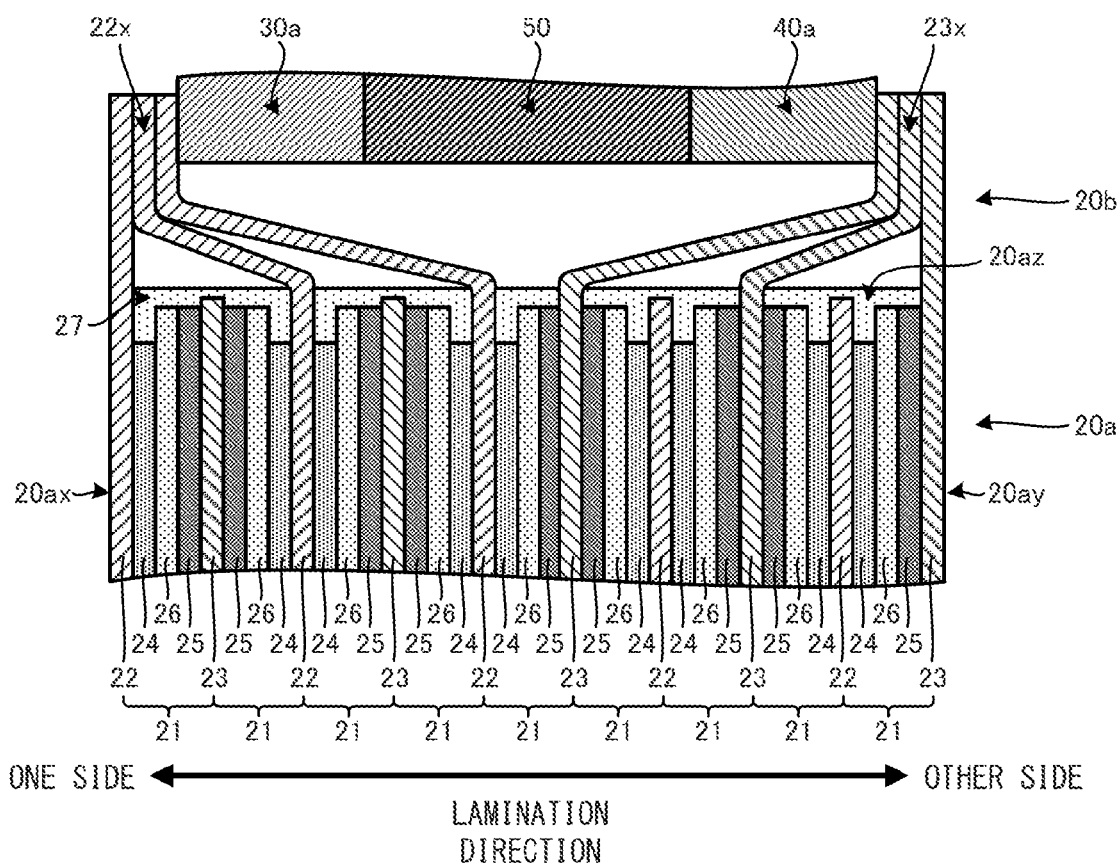
FIG. 5 schematically shows an example of the structure of a cross-section of an electrode laminate.

As shown in FIGS. 2 to 5, the electrode laminate 20 has the laminate part 20a and the current collection part 20b. As shown in FIGS. 4 and 5, the laminate part 20a has a plurality of laminated electrode bodies 21. Furthermore, as shown in FIGS. 2 to 5, the current collection part 20b has at least one positive electrode current collector 22 and at least one negative electrode current collector 23, which protrude from the laminate part 20a.

2.1 Laminate Part

As shown in FIGS. 4 and 5, the laminate part 20a has current collectors 22, 23, active material layers 24, 25, and electrolyte layers 26, which are laminated to each other. Furthermore, as shown in FIGS. 3 to 5, the laminate part 20a may have one end surface 20ax on one end side in the lamination direction, another end surface 20ay on the other end surface in the lamination direction, and side surfaces 20az which couples the one end surface 20ax and the other end surface 20ay. As shown in FIGS. 3 to 5, the side surfaces 20az can be constituted by the outer edges of the layers 22 to 26 constituting the laminate part 20a. As shown in FIGS. 4 and 5, in the laminate part 20a, the side surfaces 20az may have concavities and protrusions or gaps due to the differences in the lamination areas of the layers 22 to 26. Furthermore, as shown in FIGS. 3 to 5, the side surfaces 20az may have surfaces along the lamination direction of the layers in the electrode laminate 20.

In the laminate part 20a, at least one electrode body 21, which is a power generation element (unit cell), can be constructed by laminating the current collectors 22, 23, the active material layers 24, 25, and the electrolyte layers 26. The number of electrode bodies 21 in the laminate part 20a is not particularly limited. When the laminate part 20a comprises a plurality of electrode bodies 21, the plurality of electrode bodies 21 may be connected to each other in series, or may be connected to each other in parallel. Alternatively, in the laminate part 20a, the electrode bodies 21 may be insulated from each other by providing an insulating layer between one electrode body 21 and another electrode body 21. However, in this case, in the current collection part 20b, the plurality of electrode bodies 21 can be electrically connected to each other. In the laminate part 20a shown in FIGS. 4 and 5, though an active material layer 24, an electrolyte layer 26, an active material layer 25, and a current collector 23 may be laminated in this order on both sides of the current collector 22 (two power generating elements share one current collector 22), or alternatively, an active material layer 25, an electrolyte layer 26, an active material layer 24, and a current collector 22 may be laminated in this order on both surfaces of the current collector 23 (two power generating elements share one current collector 23), in the battery of the present disclosure, the structure of the laminate part 20a is not limited to this.

2.1.1 Current Collectors

Any current collectors which are conventional as the current collector of a battery can be adopted as the current collectors 22, 23. In the secondary battery 100, the current collector 22 may be a positive electrode current collector, and the current collector 23 may be a negative electrode current collector, or this may be reversed. For convenience, in the descriptions to follow, the current collector 22 is described as a positive electrode current collector, and the current collector 23 is described as a negative electrode current collector. Alternatively, the laminate part 20a may comprise a bipolar current collector in which serves as a positive electrode current collector and a negative electrode current collector. For example, when the current collector 22 is a bipolar current collector, the active material layer 24 is provided on one surface side of the current collector 22, and the active material layer 25 is provided on the other surface side thereof. The current collectors 22, 23 may be constituted by a metal foil or a metal mesh. From the viewpoint of excellent handleability, etc., the current collectors may be metal foils. The current collectors 22, 23 may respectively comprise a plurality of layers of metal foil. Examples of the metal constituting the current collectors 22, 23 include Cu, Ni, Cr, Au, Pt, Ag, Al, Fe, Ti, Zn, Co, and stainless steel. The current collectors 22, 23 may have some type of coating layer on the surfaces thereof for the purpose of adjusting the resistances thereof. Furthermore, when the current collectors 22, 23 comprise a plurality of layers of a metal foil, some type of layer may be provided between the plurality of metal foils. The thickness of each current collector 22, 23 is not particularly limited. For example, it may be 0.1 µm or more, or 1 µm or more, and 1 mm or less, or 100 µm or less.

2.1.2 Active Material Layers

Any active material layer which is conventional as the active material layer of a battery may be used as the active material layers 24, 25. In the secondary battery 100, the active material layer 24 may be a positive electrode active material layer, and the active material layer 25 may be a negative electrode active material layer, or this may be reversed.

The positive electrode active material layer contains at least a positive electrode active material. When the secondary battery 100 is an all-solid-state battery, the positive electrode active material layer may further optionally contain, in addition to the positive electrode active material, a solid electrolyte, a binder and a conductive aid. Furthermore, when the secondary battery 100 is a liquid electrolyte-based battery, the positive electrode active material may further optionally contain, in addition to the positive electrode active material, a binder and a conductive aid. Any known active material may be used as the positive electrode active material. Among active materials, two substances having different potentials (charge/discharge potentials) to occlude and release predetermined ions may be selected, and a substance exhibiting a relatively high potential can be used as the positive electrode active material, and a substance exhibiting a relatively low potential can be used as the negative electrode active material, which is described later. For example, when constructing a lithium-ion battery, various lithium-containing composite oxides such as lithium cobalt oxide, lithium nickel oxide, $LiNi_{1/3}Co_{1/3}Mn_{1/3}O_2$, lithium manganate, and spinel-based lithium compounds can be used as the positive electrode active material. When the secondary battery 100 is an all-solid-state battery, to suppress reaction due to contact between the positive electrode active material and the solid electrolyte, a coating layer such as a lithium niobate layer, a lithium titanate layer, or a lithium phosphate layer may be provided on the surface of the positive electrode active material. When the secondary battery 100 is an all-solid-state battery, the solid electrolyte may be an inorganic solid electrolyte. Inorganic solid electrolytes have higher ionic conductivity than organic polymer electrolytes. Furthermore, they have excellent heat resistance as compared to organic polymer electrolytes. Examples of inorganic solid electrolytes include oxide solid electrolytes such as lithium lanthanate zirconate, LiPON, $Li_{1+x}Al_xGe_{2-x}(PO_4)_3$, Li—SiO glass, and Li—Al—SO glass; and sulfide solid electrolytes such as $Li_2S$—$P_2S_5$, $Li_2S$—$SiS_2$, LiI—$Li_2S$—$SiS_2$, LiI—$Si_2S$—$P_2S_5$, $Li_2S$—$P_2S_5$—LiI—LiBr, LiI—$Li_2S$—$P_2S_5$, LiI—$Li_2S$—$P_2O_5$, LiI—$Li_3PO_4$—$P_2S_5$, and $Li_2S$—$P_2S_5$—$GeS_2$. In particular, the performance of sulfide solid electrolytes, particularly sulfide solid electrolytes containing $Li_2S$—$P_2S_5$, is high.

Examples of the binder contained in the positive electrode active material layer include butadiene rubber (BR)-based binders, butylene rubber (IIR)-based binders, acrylonitrile butadiene rubber (ABR)-based binders, polyvinylidene fluoride (PVdF)-based binders, and polytetrafluoroethylene (PTFE)-based binders. Examples of the conductive aid which can be contained in the positive electrode active material layer include carbon materials such as acetylene black and Ketjen black, and metal materials such as nickel, aluminum, and stainless steel. The content of each component in the positive electrode active material layer may be the same as the prior art. The shape of the positive electrode active material layer may be the same as the prior art. From the viewpoint of ease of construction of the secondary battery 100, the positive electrode active material layer may be sheet-shaped. The thickness of the positive electrode active material layer is not particularly limited. For example, it may be 0.1 µm or more and 2 mm or less. The lower limit may be 1 µm or more, and the upper limit may be 1 mm or less.

The negative electrode active material layer contains at least a negative electrode active material. When the secondary battery 100 is an all-solid-state battery, the negative electrode active material layer may further optionally contain, in addition to the negative electrode active material, a solid electrolyte, a binder and a conductive aid. Furthermore, when the secondary battery 100 is a liquid electrolyte-based battery, the negative electrode active material may further optionally contain, in addition to the negative electrode active material, a binder and a conductive aid. Any known active material may be used as the negative electrode active material. For example, when constructing a lithium-ion battery, silicon-based active materials such as Si, Si alloys and silicon oxide; carbon-based active materials such as graphite and hard carbon; various oxide-based active materials such as lithium titanate; metallic lithium, and lithium alloys can be used as the negative electrode active material. The solid electrolyte, the binder and the conductive aid can be appropriately selected and used from those exemplified as those used for the positive electrode active material layer. The content of each component in the negative electrode active material layer may be the same as the prior art. The shape of the negative electrode active material layer may be the same as the prior art. From the viewpoint of ease of construction of the secondary battery 100, the negative electrode active material layer may be sheet-shaped. The thickness of the negative electrode active material layer is not particularly limited. For example, it may be 0.1 µm or more and 2 mm or less. The lower limit may be 1 µm or more, and the upper limit may be 1 mm or less. The thickness and lamination area (electrode area) of the negative electrode active material layer may be adjusted so that the capacity of the negative electrode is greater than the capacity of the positive electrode.

2.1.3 Electrolyte Layer

Any electrolyte layer which is conventionally used as the electrolyte layer of a battery can be used as the electrolyte layer 26. The electrolyte layer 26 contains at least an electrolyte. When the secondary battery 100 is an all-solid-state battery, the electrolyte layer 26 may contain a solid electrolyte and optionally a binder. The solid electrolyte may be an inorganic solid electrolyte, as described above, and in particular, a sulfide solid electrolyte. As the binder, the same binder as that used for the positive electrode active material layer can be appropriately selected and used. The content of each component in the solid electrolyte layer may be the same as the prior art. The shape of the solid electrolyte layer may be the same as the prior art. From the viewpoint of ease of construction of the secondary battery 100, the electrolyte layer may be a sheet-shaped solid electrolyte layer. The thickness of the solid electrolyte layer may be, for example, 0.1 μm or more and 2 mm or less. The lower limit may be 1 μm or more and the upper limit may be 1 mm or less. Conversely, when the secondary battery 100 is a liquid electrolyte-based battery, the electrolyte layer 26 can comprise a liquid electrolyte and a separator. A known liquid electrolyte and separator may be used. Note that when the case in which the electrolyte layer 26 is a liquid electrolyte layer is compared with the case in which it is a solid electrolyte layer, it is considered that it is easier to construct the secondary battery 100 when the electrolyte layer 26 is a solid-state electrolytic layer, i.e., when the secondary battery 100 is an all-solid-state battery. Furthermore, when the secondary battery 100 is an all-solid-state battery, problems related to expansion and contraction of the battery are more likely to occur, and the effect of the technology of the present disclosure becomes more remarkable.

2.1.4 Other

As shown in FIGS. 4 and 5, at least one of the current collectors 22, 23 the active material layers 24, 25, and the electrolyte layer 26 may protrude on the side surface 20*az* of the laminate part 20*a*, and concavities and protrusions or gaps may be formed in the side surface 20*az*. For example, by making the lamination area of the negative electrode current collector and the negative electrode active material layer greater than the lamination area of the positive electrode current collector and the positive electrode active material layer, the negative electrode current collector and the negative electrode active material layer may protrude on the side surface 20*az* of the laminate part 20*a*. Furthermore, by making the lamination area of the electrolyte area greater than the lamination area of the positive electrode current collector layer and the positive electrode active material layer, the electrolyte layer may protrude on the side surface 20*az* of the laminate part 20*a*.

As shown in FIGS. 4 and 5, the side surface 20*az* of the laminate part 20*a* may be sealed by a resin layer 27. As a result, the water resistance and mechanical strength of the battery are improved. The resin layer 27 may be integral with the holder 50, or may be constituted as a separate body. In particular, by constructing the holder 50 and the resin layer 27 as separate bodies, the first terminal 30 and the second terminal 40 can be more easily suitably supported by the holder 50, and the force from the first terminal 30 and the force from the second terminal 40 are more likely to offset each other via the holder 50.

2.2 Current Collection Part

As shown in FIGS. 2 to 6, the current collection part 20*b* is constituted by the current collectors 22, 23, which protrude from the side surface 20*az* of the laminate part 20*a*. Though the effects brought about by the technology of the present disclosure can be exhibited even in the case in which the positive electrode current collector 22 and the negative electrode current collector 23 protrude from different side surfaces 20*az* of the laminate part 20, in the case in which the positive electrode current collector 22 and the negative electrode current collector 23 protrude from one side surface 20*az* of the laminate part 20*a*, a greater effect can be expected. For example, when the planar shape of the laminate part 20*a* (the shape of the laminated surface of the electrode body) is rectangular, both the positive electrode current collector 22 and the negative electrode current collector 23 may protrude from one side of the rectangular shape to form the current collection part 20*b*.

As shown in FIGS. 3 and 4, in the current collection part 20*b*, the positive electrode current collector 22 and the negative electrode current collector 23 may not face each other in the lamination direction of the electrode bodies 21. Alternatively, as shown in FIG. 5 (and FIG. 12), in the current collection part 20*b*, the positive electrode current collector 22 and the negative electrode current collector 23 can face each other in the lamination direction of the electrode bodies 21 depending on the method of collecting foil of the current collector and the connection structure of the terminals. In the aspect shown in FIG. 5, in addition to the current collection part 20*b* provided on the illustrated side surface 20*az*, a current collection part 20*b* may be provided on the unillustrated side surface 20*az*.

As shown in FIGS. 4 and 5, in the secondary battery 100, the current collection part 20*b* may have a plurality of positive electrode current collectors 22 and a plurality of negative electrode current collectors 23 which protrude from the laminate part 20*a*, the plurality of positive electrode current collectors 22 may be connected to each other to form a first terminal connection part 22*x* and the plurality of negative electrode current collectors 23 may be connected to each other to form a second terminal connection part 23*x*. In this case, the first connection part 30*a* of the first terminal 30 may be connected to one of the first terminal connection part 22*x* and the second terminal connection part 23*x*, and the second connection part 40*a* of the second terminal 40 may be connected to the other of the first terminal connection part 22*x* and the second terminal connection part 23*x* (the terminal connection part to which the first terminal 30 is not connected). In the prior art, in the case in which a plurality of current collectors are bundled (collected) and connected to one terminal, when force is applied from the terminal to the plurality of current collectors due to expansion or contraction of the battery, it is considered that scratching and damage are likely to occur in at least a part of a plurality of current collectors, coupled with the tension of the current collector accompanying the current collection. In connection thereto, in the secondary battery 100 of the present disclosure, even if the battery expands or contracts, due to the shapes of the terminals 30, 40 and the presence of the holder 50, the force transmitted from terminals 30, 40 to current collectors 22, 23 can be reduced, whereby scratching of and damage to the current collectors 22, 23 are likely to be suppressed.

Figure 6:
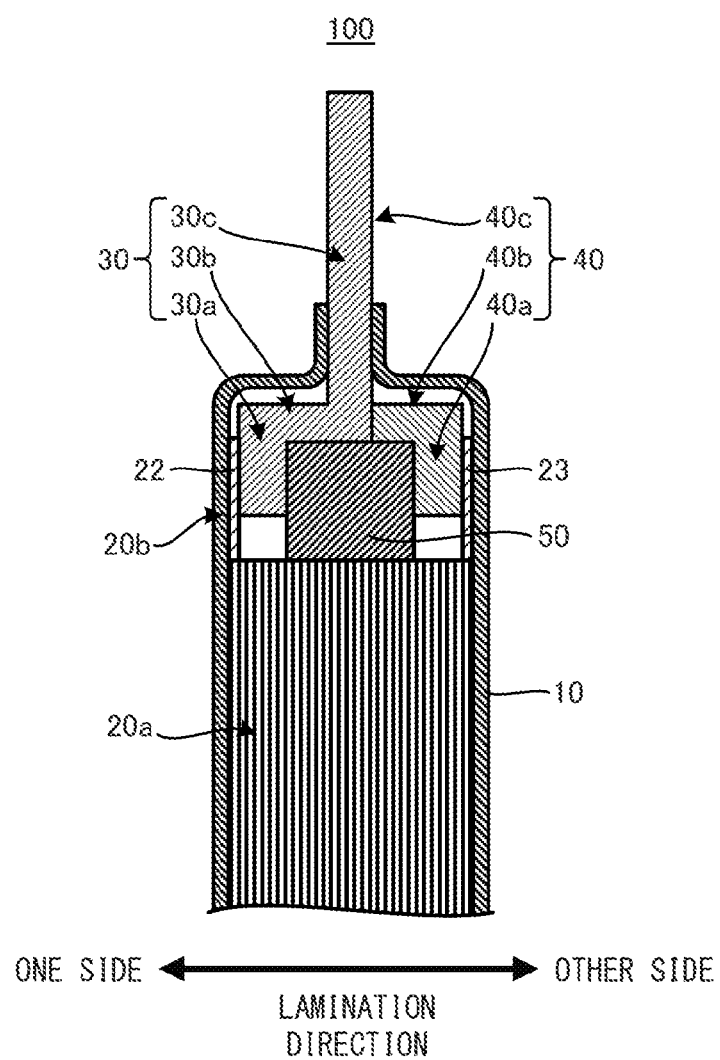
FIG. 6 schematically shows an example of the cross-sectional structure of a secondary battery having a bipolar structure.
Figure 7B:
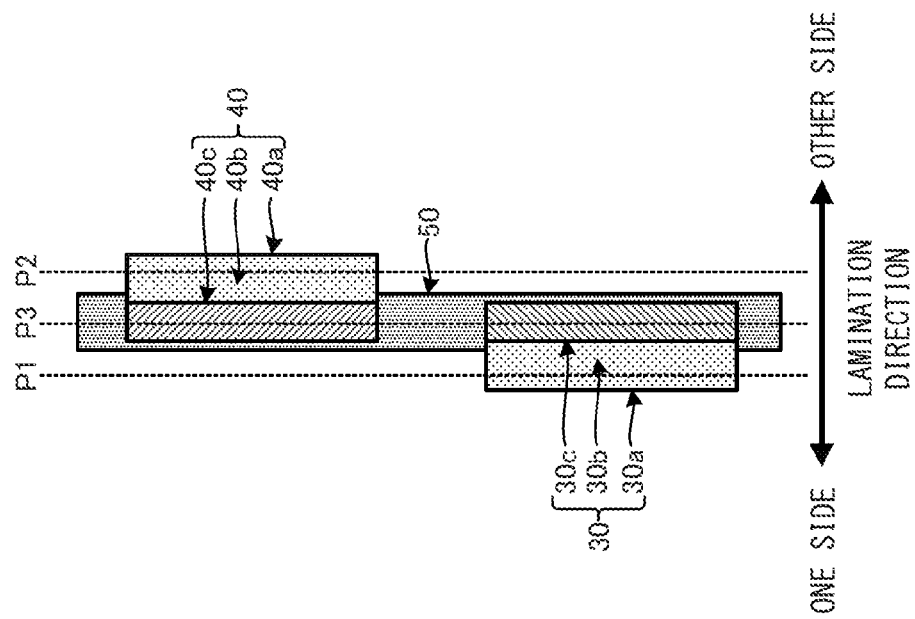
FIG. 7B schematically shows a plan view of FIG. 7A as viewed from above.
Figure 7A:
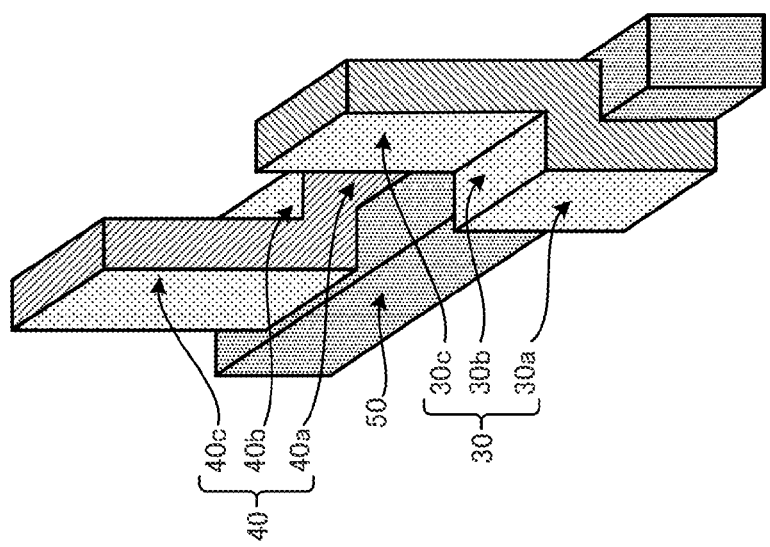
FIG. 7A schematically shows a perspective view of an example of the structure of a terminal supported by the holder.

Alternatively, as shown in FIG. 6, in the secondary battery 100, the current collection part 20*b* may have one each of the positive electrode current collector 22 and the negative electrode current collector 23, which protrude from the laminate part 20*a*. Specifically, the electrode laminate 20 may have a bipolar configuration. In this case, the first connection part 30*a* of the first terminal 30 may be connected to one of the one positive electrode current collector 22 and the one negative electrode current collector 23, and the second connection part 40*a* of the second terminal 40 may be connected to the other of the one positive electrode current collector 22 and the one negative electrode current collector 23 (the current collector to which the first terminal 30 is not connected).

3. First Terminal

As shown in FIGS. 1 to 6, the first terminal 30 has the first connection part 30*a*, the first crank-shaped part 30*b*, and the first protrusion 30*c*. The first terminal 30 has a shape and a material that transmit the electrical power generated by the electrochemical reaction in the laminate part 20*a* to the outside through the current collection part 20*b*. The shape of the first terminal 30 may be plate-shaped except that it has a first crank-shaped part 30*b* and is bent in a predetermined direction. For example, the first terminal 30 can be formed by bending a plate having a rectangular planar shape. The first terminal 30 may be composed, for example, of a metal.

Examples of the metal constituting the first terminal 30 include Cu, Ni, Cr, Au, Pt, Ag, Al, Fe, Ti, Zn, Co, and stainless steel. The first terminal 30 may be composed of a metal having a high rigidity, and may be composed of, for example, Cu, Al or alloys thereof. As will be described later, when the first terminal 30 is thick (for example, 1 mm or more), the first terminal 30 may be composed of pure copper or pure aluminum, which have excellent conductivity. The metal constituting the first terminal 30 may be the same as or different from the metal constituting the second terminal 40. Furthermore, the metal constituting the first terminal 30 may be the same as or different from the metal constituting the current collector 22 or 23, which is to be connected to the first terminal 30. When the metal constituting the first terminal 30 and the metal constituting the current collector 22 or 23, which is to be connected to the first terminal 30, are the same, connection between the first terminal 30 and the current collector 22 or 23 becomes easier.

In the secondary battery 100, a rigid first terminal 30 can be used. For example, the first terminal 30 may have a thickness of 0.5 mm or more, 1.0 mm or more, or 1.5 mm or more. The upper limit of the thickness is not particularly limited, and may be, for example, 10.0 mm or less, 7.0 mm or less, or 5.0 mm or less. By making the first terminal 30 thick, for example, a large current can be passed through the terminal, enabling quick-charging. In the case in which a highly-rigid terminal is used in a conventional secondary battery, when the battery expands or contracts, a large force is applied from the terminals to the exterior bodies or current collectors, which easily leads to scratching of or damage to the exterior body or current collectors. In connection thereto, in the secondary battery 100, even when the battery expands or contracts, scratching of and damage to the exterior body 10 and the current collectors 22, 23 are likely to be suppressed due to the shapes of the terminals 30, 40 and the presence of the holder 50.

3.1 First Connection Part

As shown in FIGS. 2 to 6, the first connection part 30a is connected to one of the positive electrode current collector 22 and the negative electrode current collector 23. The method for connecting the first connection part 30a and the current collectors 22, 23 is not particularly limited, and various methods such as connection with an adhesive or connection by welding can be adopted.

As shown in FIGS. 2 to 6, the first connection part 30a is provided on one side of the plurality of electrode bodies 21 in the lamination direction with respect to the second connection part 40a. In other words, a predetermined gap is provided between the first connection part 30a and the second connection part 40a in the lamination direction. As a result, for example, the holder 50 can easily be arranged between the first connection part 30a and the second connection part 40a in the lamination direction, and the force from the first terminal 30 toward the other side in the lamination direction and the force from the second terminal 40 toward the one side in the lamination direction can more easily be offset by the holder 50.

As shown in FIGS. 2 to 6, the first connection part 30a may contact the holder 50. By bringing the first connection part 30a into contact with the holder 50, it becomes easier to suppress displacement of the first terminal 30 when the battery expands or contracts. Specifically, the first connection part 30a may be arranged between the current collector 22 or 23 arranged on one side of the electrode bodies 21 in the lamination direction (the terminal connection part 22x or 23x) and the holder 50 arranged on the other side in the lamination direction, and among the surfaces of the first connection part 30a, the surface on the one side in the lamination direction may contact the current collector 22 or 23 (the terminal connection part 22x or 23x), and the surface on the other side in the lamination direction may contact the holder 50.

As shown in FIGS. 2 to 6, the connection surface between the first connection part 30a and the current collector 22 or 23 may intersect the lamination direction of the electrode bodies 21, or may be substantially orthogonal to the lamination direction. As a result, the first connection part 30a can more easily be connected to the current collector 22 or 23, which protrudes from the laminate part 20a.

3.2 First Crank-Shaped Part

As shown in FIGS. 2 and 3, the first crank-shaped part 30b couples (connects) the first connection part 30a and the first protrusion 30c. Furthermore, the first crank-shaped part 30b is bent from the first connection part 30a toward the other side in the lamination direction. Specifically, due to the presence of the first crank-shaped part 30b, the distance between the first protrusion 30c and the second protrusion 40c in the lamination direction of the electrode bodies 21 is reduced, whereby sealing of the exterior body 10 is easier. In other words, for example, adhesion of the seal part 10a becomes stronger, and damage of the seal part 10a due to the forces from the terminals is more likely to be suppressed.

As shown in FIG. 2, the first crank-shaped part 30b may have a surface parallel to the lamination direction of the electrode bodies 21. In other words, the first crank-shaped part 30b may extend from the first connection part 30a toward the first protrusion 30c along the lamination direction of the electrode bodies 21. Alternatively, the first crank-shaped part 30b may have a surface which intersects the lamination direction.

Figure 8B:
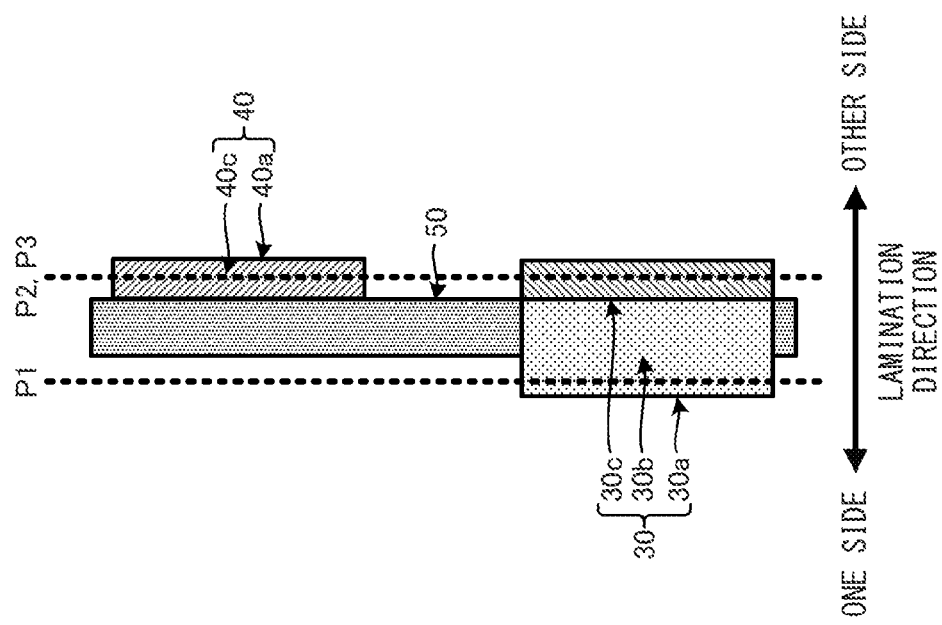
FIG. 8B schematically shows a plan view of FIG. 8A as viewed from above.
Figure 8A:
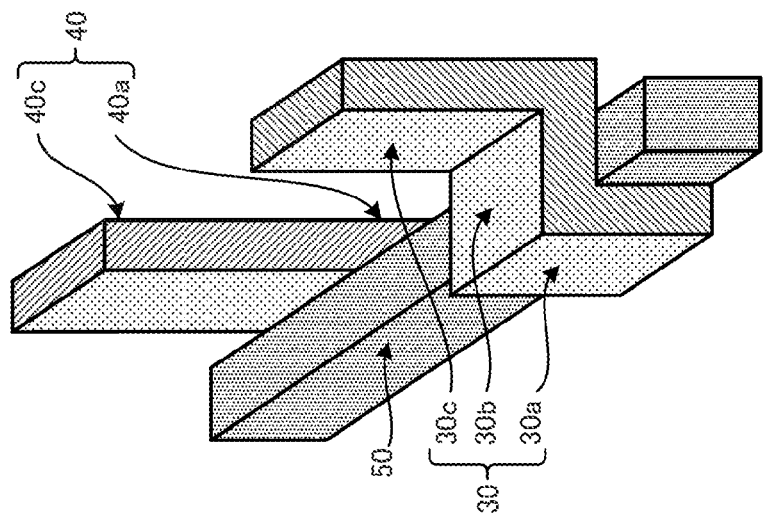
FIG. 8A schematically shows a perspective view of an example of the structure of a terminal supported by the holder.

In the secondary battery 100, by bending the terminal at the first crank-shaped part 30b, the first protrusion 30c can be arranged at predetermined positions different from the position of the first connection part 30a in the lamination direction of the electrode bodies 21. For example, as shown in FIGS. 7A and 7B and FIGS. 9A and 9(B), when a first plane P1 orthogonal to the lamination direction of the electrode bodies 21 and transecting the first connection part 30a and a second plane P2 orthogonal to the lamination direction and transecting the second connection part 40a are assumed, the first protrusion 30c may be positioned between the first plane P1 and the second plane P2, or alternatively, as shown in FIGS. 8A and 8B, the second plane P2 may transect the first protrusion 30c.

The bending angle between the first connection part 30a and the first crank-shaped part 30b and the bending angle between the first crank-shaped part 30b and the first protrusion 30c are not particularly limited. For example, as shown in FIG. 2, etc., each bending angle may be substantially a right angle, or alternatively, may be an acute angle or an obtuse angle. Furthermore, as shown in FIGS. 7 to 9, the bending angle between the first connection part 30a and the first crank-shaped part 30b may have an angle corresponding to the outer shape of the holder 50 so that the first terminal 30 is bent in accordance with the shape of the holder 50. Furthermore, as shown in FIGS. 7 to 9, the first crank-shaped part 30b may contact the holder 50. As a result, the first terminal 30 can easily be securely affixed to the holder 50, and the first terminal 30 can easily be appropriately supported by the holder 50.

3.3 First Protrusion

As shown in FIGS. 1 and 2, etc., the first protrusion 30c protrudes to the outside of the exterior body 10. As a result, the electrical power generated by the electrochemical reaction in the laminate part 20a can be transmitted to the outside via the first protrusion 30c. The protrusion direction of the first protrusion 30c may be, for example, a direction which intersects the lamination direction of the electrode bodies 21, or may be a direction substantially orthogonal to the lamination direction. The protrusion direction of the first protrusion 30c may be the same as the protrusion direction of the second protrusion 40c. Furthermore, the first protrusion 30c and the second protrusion 40c may protrude from one surface constituting the battery. The protrusion length of the first protrusion 30c is not particularly limited, and can have a length which is appropriate in accordance with the design of the battery.

As shown in FIGS. 1 to 3, etc., the first protrusion 30c does not face the second protrusion 40c in the lamination direction. As a result, electrical contact between the first protrusion 30c and the second protrusion 40c can easily be avoided, whereby short circuiting of the battery is less likely to occur.

4. Second Terminal

As shown in FIGS. 1 to 6, the second terminal 40 has the second connection part 40a and the second protrusion 40c. Furthermore, the second terminal 40 may have a second crank-shaped part 40b. The second terminal 40 has a shape and a material that transmit the electrical power generated by the electrochemical reaction in the laminate part 20a to the outside through the current collection part 20b. The shape of the second terminal 40 may be plate-shaped. For example, a plate-like terminal having a rectangular planar shape may be used as the second terminal 40. Alternatively, when the second terminal 40 has the second crank-shaped part 40b, the shape of the second terminal 40 may be the same as or different from the shape of the first terminal 30. However, as will be described later, the orientations of the crank-shaped parts are opposite to each other at the first terminal 30 and the second terminal 40. For example, the second terminal 40 may be formed by bending a plate having a rectangular planar shape. The second terminal 40 may be composed, for example, of a metal. Examples of the metal constituting the second terminal 40 include Cu, Ni, Cr, Au, Pt, Ag, Al, Fe, Ti, Zn, Co, and stainless steel. The second terminal 40 may be composed of a metal having a high rigidity, and may be composed of, for example, Cu, Al or alloys thereof. As will be described later, when the second terminal 40 is thick (for example, 1 mm or more), the second terminal 40 may be composed of pure copper or pure aluminum, which have excellent conductivity. The metal constituting the second terminal 40 may be the same as or different from the metal constituting the first terminal 30. Furthermore, the metal constituting the second terminal 40 may be the same as or different from the metal constituting the current collector 22 or 23, which is to be connected to the second terminal 40. When the metal constituting the second terminal 40 and the metal constituting the current collector 22 or 23, which is to be connected to the second terminal 40, are the same, connection between the second terminal 40 and the current collector 22 or 23 becomes easier.

In the secondary battery 100, a second terminal 40 having rigidity can be used. For example, the second terminal 40 may have a thickness of 0.5 mm or more, 1.0 mm or more, or 1.5 mm or more. The upper limit of the thickness is not particularly limited, and may be, for example, 10.0 mm or less, 7.0 mm or less, or 5.0 mm or less. By making the second terminal 40 thick, for example, a large current can be passed through the terminal, enabling quick-charging. In the case in which a highly-rigid terminal is used in a conventional secondary battery, when the battery expands or contracts, a large force is applied from the terminals to the exterior bodies or current collectors, which easily leads to scratching of or damage to the exterior body or current collectors. In connection thereto, in the secondary battery 100, even when the battery expands or contracts, scratching of and damage to the exterior body 10 and the current collectors 22, 23 are likely to be suppressed due to the shapes of the terminals 30, 40 and the presence of the holder 50.

4.1 Second Connection Part

As shown in FIGS. 2 to 6, the second connection part 40a is connected to the other of the positive electrode current collector 22 and the negative electrode current collector 23 (the current collector to which the first connection part 30a is not connected). The method for connecting the second connection part 40a and the current collectors 22, 23 is not particularly limited, and various methods such as connection with an adhesive or connection by welding can be adopted.

As shown in FIGS. 2 to 6, the second connection part 40a is provided on the other side of the plurality of electrode bodies 21 in the lamination direction with respect to the first connection part 30a. As a result, for example, the holder 50 can easily be arranged between the first connection part 30a and the second connection part 40a in the lamination direction, and the force from the first terminal 30 toward the other side in the lamination direction and the force from the second terminal 40 toward the one side in the lamination direction can more easily be offset by the holder 50.

As shown in FIGS. 2 to 6, the second connection part 40a may contact the holder 50. By bringing the second connection part 40a into contact with the holder 50, it becomes easier to suppress displacement of the second terminal 40 when the battery expands or contracts. Specifically, the second connection part 40a may be arranged between the current collector 22 or 23 arranged on the other side of the electrode bodies 21 in the lamination direction (the terminal connection part 22x or 23x) and the holder 50 arranged on tone side in the lamination direction, and among the surfaces of the second connection part 40a, the surface on the other side in the lamination direction may contact the current collector 22 or 23 (the terminal connection part 22x or 23x), and the surface on the one side in the lamination direction may contact the holder 50.

As shown in FIGS. 2 to 6, the connection surface between the second connection part 40a and the current collector 22 or 23 may intersect the lamination direction of the electrode bodies 21, or may be substantially orthogonal to the lamination direction. As a result, the second connection part 40a can more easily be connected to the current collector 22 or 23, which protrudes from the laminate part 20a.

4.2 Second Crank-Shaped Part

As shown in FIGS. 2 to 5, when the second terminal 40 comprises the second crank-shaped part 40b, the second crank-shaped part 40b couples (connects) the second connection part 40a and the second protrusion 40c. The second crank-shaped part 40b is bent from the second connection part 40a toward the one side in the lamination direction. Specifically, the direction of bending of the second crank-shaped part 40b is the direction opposite the direction of bending of the first crank-shaped part 30b. The first crank-shaped part 30b and the second crank-shaped part 40b do not face each other in the lamination direction. As a result, when the second terminal 40 comprises the second crank-shaped part 40b, the first protrusion 30c and the second protrusion 40c can be positioned between the first plane P1 and the second plane P2. Due to the presence of the second crank-shaped part 40b, the distance between the first protrusion 30c and the second protrusion 40c in the lamination direction of the electrode bodies 21 is reduced, whereby sealing of the exterior body 10 is easier. In other words, for example, adhesion of the seal part 10a becomes stronger, and damage of the seal part 10a due to the forces from the terminals is more likely to be suppressed.

As shown in FIG. 2, the second crank-shaped part 40b may have a surface parallel to the lamination direction of the electrode bodies 21. In other words, the second crank-shaped part 40b may extend from the second connection part 40a toward the second protrusion 40c along the lamination direction of the electrode bodies 21. Alternatively, the second crank-shaped part 40b may have a surface which intersects the lamination direction.

In the secondary battery 100, due to the absence of the second crank-shaped part 40b, the second protrusion 40c may be arranged in substantially the same position as the second connection part 40a in the lamination direction of the electrode bodies, or alternatively by bending the terminal at the second crank-shaped part 40b, the second protrusion 40c may be arranged at predetermined positions different from the position of the second connection part 40a in the lamination direction of the electrode bodies 21. For example, as shown in FIGS. 7A and 7B and FIGS. 9A and 9B, when the first plane P1 orthogonal to the lamination direction of the electrode bodies 21 and transecting the first connection part 30a and the second plane P2 orthogonal to the lamination direction and transecting the second connection part 40a are assumed, the second protrusion 40c may be positioned between the first plane P1 and the second plane P2, or alternatively, as shown in FIGS. 8A and 8B, the second plane P2 may transect the second protrusion 40c.

When the second terminal 40 comprises the second crank-shaped part 40b, the bending angle between the second connection part 40a and the second crank-shaped part 40b and the bending angle between the second crank-shaped part 40b and the second protrusion 40c are not particularly limited. For example, as shown in FIG. 2, etc., each bending angle may be substantially a right angle, or alternatively, may be an acute angle or an obtuse angle. Alternatively, as shown in FIGS. 7 to 9, the bending angle between the second connection part 40a and the second crank-shaped part 40b may have an angle corresponding to the outer shape of the holder 50 so that the second terminal 40 is bent in accordance with the shape of the holder 50. Furthermore, as shown in FIGS. 7 and 9, the second crank-shaped part 40b may contact the holder 50. As a result, the second terminal 40 can easily be securely affixed to the holder 50, and the second terminal 40 can easily be appropriately supported by the holder 50.

4.3 Second Protrusion

As shown in FIGS. 1 and 2, etc., the second protrusion 40c protrudes to the outside of the exterior body 10. As a result, the electrical power generated by the electrochemical reaction in the laminate part 20a can be transmitted to the outside via the second protrusion 40c. The protrusion direction of the second protrusion 40c may be, for example, a direction which intersects the lamination direction of the electrode bodies 21, or may be a direction substantially orthogonal to the lamination direction. The protrusion direction of the second protrusion 40c may be the same as the protrusion direction of the first protrusion 30c. Furthermore, the first protrusion 30c and the second protrusion 40c may protrude from one surface constituting the battery. The protrusion length of the second protrusion 40c is not particularly limited, and can have a length which is appropriate in accordance with the design of the battery.

As shown in FIGS. 1 to 3, etc., the second protrusion 40c does not face the first protrusion 30c in the lamination direction. As a result, electrical contact between the first protrusion 30c and the second protrusion 40c can easily be avoided, whereby short circuiting of the battery is less likely to occur.

5. Supplement of Positional Relationship between First Terminal and Second Terminal The first connection part 30a and the second connection part 40a may have the following positional relationship in addition to being arranged in different positions in the lamination direction of the electrode bodies 21 as described above. In other words, as shown in FIG. 9, in the secondary battery 100, at least a part of the first connection part 30a and at least a part of the second connection part 40a may face each other in the lamination direction. As a result, when the battery expands or contracts, the force from the first terminal 30 and the force from the second terminal 40 are likely to offset each other via the holder 50. Furthermore, it is unlikely that the holder 50 will rotate due to the force from the first terminal 30 and the force from the second terminal 40.

As described above, in the secondary battery 100, the first protrusion 30c is positioned between the first plane P1 and the second plane P2, or the second plane P2 transects the first protrusion 30c. Furthermore, the second protrusion 40c is positioned between the first plane P1 and the second plane P2, or the second plane P2 transects the second protrusion 40c. As shown in FIGS. 7 to 9, the first protrusion 30c and the second protrusion 40c may be arranged side-by-side so that one surface orthogonal to the lamination direction of the electrode bodies 21 is transected, or alternatively, the first protrusion 30c and the second protrusion 40c may have a space in the lamination direction. In particular, as shown in FIGS. 7 to 9, in the case in which a third plane P3 which is orthogonal to the lamination direction of the electrode bodies 21 and which transects the first protrusion 30c is assumed, when the third plane P3 transects the second protrusion 40c, sealing of the exterior body 10 becomes easier.

6. Holder

The holder 50 contacts the first terminal 30 and the second terminal 40 and supports the first terminal 30 and the second terminal 40. The holder 50 may be affixed to the first terminal 30 and the second terminal 40. Furthermore, the holder 50 may simply be abutted to the first terminal 30 and the second terminal 40, or may be adhered thereto.

It is sufficient that the holder 50 have a shape which is capable of supporting the first terminal 30 and the second terminal 40. For example, as shown in FIGS. 2 to 9, the holder 50 may extend in a direction intersecting the lamination direction of the electrode bodies 21, or may extend in the surface direction of the side surface 20az of the laminate part 20a. Furthermore, as shown in FIGS. 2 to 9, the holder 50 may be a plate-shaped member or a rod-shaped member extending in a direction intersecting the lamination direction of the electrode bodies 21. Furthermore, as shown in FIGS. 2 to 9, the holder 50 may have a rectangular cross-sectional shape or may have a cross-sectional shape other than a rectangular shape. Further, as shown in FIGS. 7 to 9, the shape of the holder 50 may be a straight shape in the longitudinal direction or may be a bent shape. The longitudinal direction of the holder 50 may intersect the lamination direction of the electrode bodies 21, may be substantially orthogonal thereto, or may be along the surface direction of the side surface 20az.

The material of the holder 50 may be any material that has an insulating property which can prevent a short circuit between the first terminal 30 and the second terminal 40 and which can support the first terminal 30 and the second terminal 40. For example, the holder 50 may be composed of a thermoplastic resin or a curable resin. For example, the curable resin may be a thermosetting resin, a photocurable resin (for example, a UV curable resin), or an electron ray curable resin. More specifically, the holder 50 may be composed of at least one resin selected from polyetheretherketone (PEEK) resins, polyphenylene sulfide (PPS) resins, and polyimide (PI) resins. PEEK, PPS, and PI are all excellent in rigidity and insulation. Alternatively, the holder 50 may be composed of at least one resin selected from epoxy resins, acrylic resins, polyester resins, polypropylene resins, polyamide resins, polystyrene resins, polyvinyl chloride resins, polycarbonate resins, and polytetrafluoroethylene resins.

In the secondary battery 100, it is sufficient that the position in which the holder 50 is positioned be a position in which it is capable of supporting the first terminal 30 and the second terminal 40. For example, as shown in FIGS. 2 to 6, the holder 50 may be provided in the interior of the exterior body 10, and may be provided between the electrode laminate 20 and the inner surface of the exterior body 10. Though the holder 50 can be provided outside of the exterior body 10, if the holder 50 is provided inside the exterior body 10, it becomes easier to affix the holder 50, and a greater effect can be expected. Furthermore, the size of the battery can be easily reduced.

Furthermore, as shown in FIGS. 7 to 9, the holder 50 may be present at least between the first plane P1 and the second plane P2, and the holder 50 may contact the first connection part 30*a* and the second connection part 40*a*. As a result, the first terminal 30 and the second terminal 40 may be more effectively supported by the holder 50. Furthermore, as shown in FIGS. 7 to 9, the holder 50 may be interposed by the first terminal 30 and the second terminal 40.

Though FIGS. 2 to 9 illustrate an embodiment in which the holder 50 is provided only between the first terminal 30 and the second terminal 40 in the lamination direction of the electrode bodies 21, the position of the holder 50 is not limited thereto. For example, the holder 50 may or may not contact the exterior body 10. Furthermore, the holder 50 may or may not contact the electrode laminate 20. Furthermore, the holder 50 may be affixed to the terminals 30, 40, or may be affixed to a member other than the terminals 30, 40 (for example, the exterior body 10 or the electrode laminate 20). Furthermore, the holder 50 may be present in the entire space between the exterior body 10 and the laminate part 20*a* in the interior of the exterior body 10.

When producing the secondary battery 100, the timing at which the holder 50 is installed is not particularly limited. For example, after preparing the electrode laminate 20 and sealing it with the resin layer 27, the first terminal 30 and the second terminal 40 are connected to the current collection part 20*b*, and thereafter, the holder 50 may be brought into contact with the first terminal 30 and the second terminal 40 to support the first terminal 30 and the second terminal 40. Alternatively, the holder may be brought into contact with the first terminal 30 and the second terminal 40 to support the first terminal 30 and the second terminal 40, and then the first terminal 30 and the second terminal 40 may be connected to the current collection part 20*b*. Furthermore, after connecting the first terminal 30 and the second terminal 40 to the current collection part 20*b* and supporting the first terminal 30 and the second terminal 40 with the holder 50, the electrode laminate 20, etc., may be housed and sealed in the exterior body 10.

7. Other Members

The secondary battery 100 may comprise various members in addition to the members described above. For example, the secondary battery 100 may be restrained by a restraining member (not illustrated). The direction of the restraining pressure by the restraining member may be the same as the lamination direction of the electrode bodies 21. As a result, interfacial resistance in the electrode laminate 20 can be reduced, and a high-performance assembled battery can be obtained.

Figure 10B:
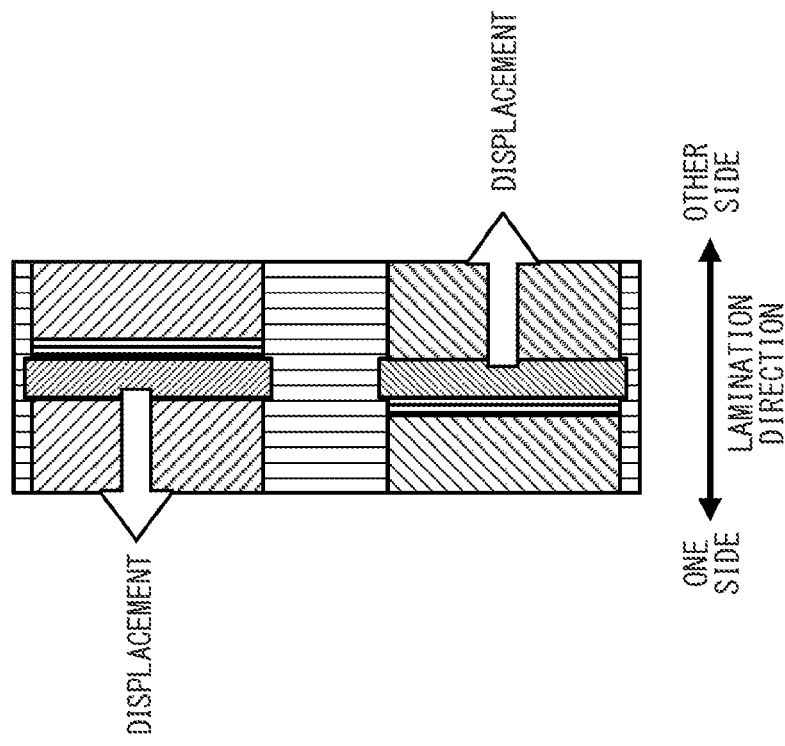
FIG. 10B shows a schematic plan view of the secondary battery of FIG. 10(A) as viewed from above, and in which the exterior body has been omitted.
Figure 10A:
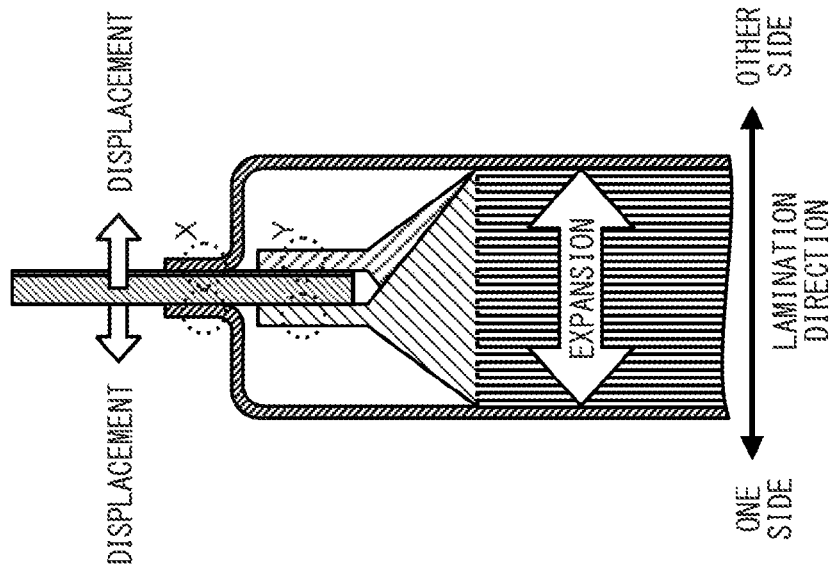
FIG. 10A shows a cross-sectional schematic view of the secondary battery according to the prior art and shows problems caused by the secondary battery according to the prior art.

8. Problems of Prior Art and Problem-Solving Mechanism According to Secondary Battery of Present Disclosure As shown in FIGS. 10A and 10B, in conventional secondary batteries, when, for example, the battery expands or contracts, the terminals connected to the electrode laminate tend to be displaced in the lamination direction of the electrode bodies. According to the findings of the present inventors, as shown in FIGS. 10A and 10B, the direction of displacement of the positive electrode terminal and the direction of displacement of the negative electrode terminal are opposite to each other. When the position of the terminal is displaced in the secondary battery, a force is applied to the contact part X (particularly the seal part) between the terminal and the exterior body and the connection part Y between the terminal and the current collector shown in FIGS. 10A and 10B, whereby scratching of and damage to the current collectors are likely to occur.

Figure 11A:
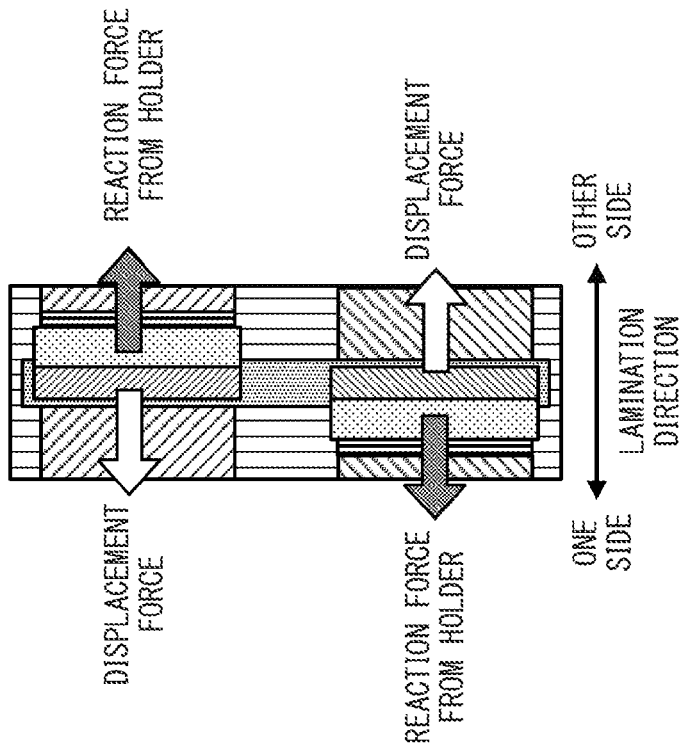
FIG. 11A shows a cross-sectional schematic view of the secondary battery of the present disclosure and shows the problem-solving mechanism of the secondary battery of the present disclosure.
Figure 11B:
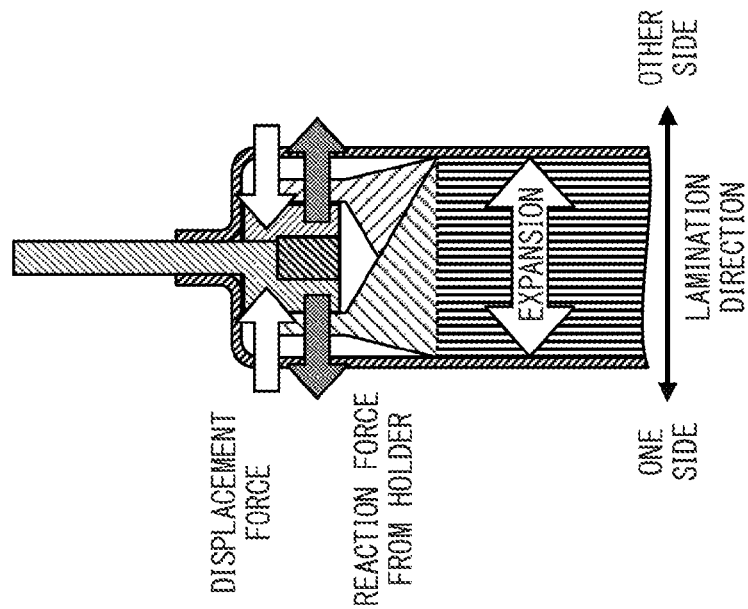
FIG. 11B shows a schematic plan view of the secondary battery of FIG. 11(A) as viewed from above, and in which the exterior body has been omitted.

In connection thereto, in the secondary battery 100 of the present disclosure, as shown in, for example, FIGS. 11A and 11B, even if the first terminal 30 and the second terminal 40 are to be displaced in opposite directions due to the expansion of the battery, the displacement of the terminals 30 and 40 is suppressed by the reaction force from the holder 50. More specifically, since force F1 to displace the first terminal 30 is transmitted to the second terminal 40 via the holder 50, and force F2 to displace the second terminal 40 is transmitted to the first terminal 30 via the holder 50, the force F1 and the force F2 offset each other, and as a result, displacement of the terminals 30, 40 is unlikely to occur. In other words, the displacement loads of opposite phases by the terminals 30 and 40 offset each other via the holder 50, whereby the structural reliability of the exterior body 10 and the current collectors 22, 23 is improved. This effect is considered to be further increased when at least a part of the first connection part 30 and at least a part of the second connection part 40*a* face each other in the lamination direction of the electrode bodies 21, as shown in FIGS. 12A and 12B.

Furthermore, as described above, in the secondary battery 100 of the present disclosure, by providing the first terminal 30 with the first crank-shaped part 30*b*, the position of the first protrusion 30*c* and the position of the second protrusion 40*c* can be brought closer in the lamination direction, whereby sealing of the exterior body 10 is easier, and the strength of the seal part 10*a* can easily be improved. In this regard as well, the structural reliability of the exterior body 10 is improved, and scratching of and damage to the exterior body 10 are likely to be suppressed.

9. Battery Pack

Figure 13A:
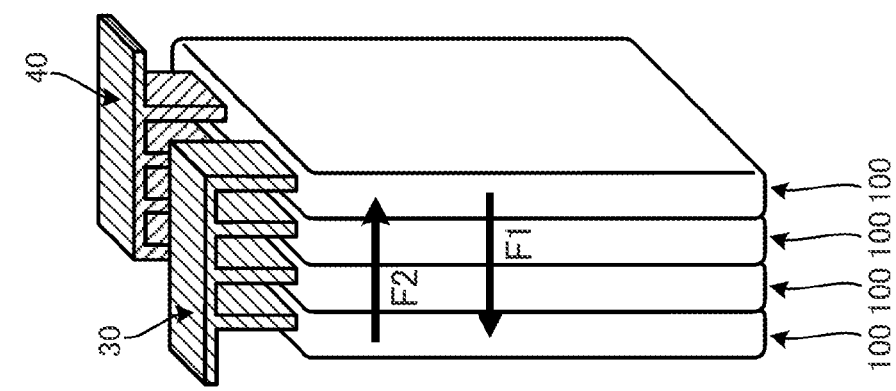
FIG. 13A schematically shows an example of the structure of a battery pack in which secondary batteries are electrically connected in parallel.
Figure 13B:
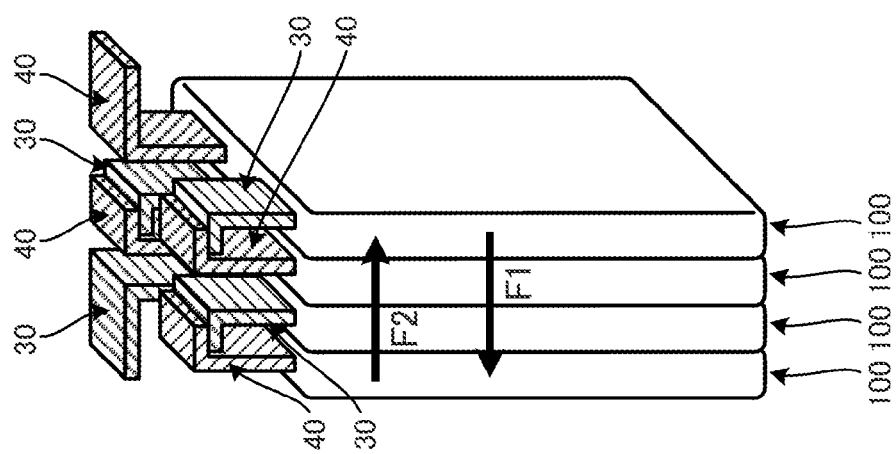
FIG. 13B schematically shows an example of the structure of a battery pack in which secondary batteries are electrically connected in series.

A battery pack can be constructed by laminating a plurality of the secondary battery 100 of the present disclosure and electrically connecting the plurality of secondary batteries 100 to each other. For example, in the battery pack, the lamination direction of the plurality of secondary batteries 100 may be aligned with the lamination direction of the electrode bodies 21, and the plurality of secondary batteries 100 may be connected to each other in parallel (FIG. 13A), or alternatively, may be connected to each other in series (FIG. 13B). In either case, as shown in FIGS. 13A and 13B, the direction of the reaction force F1 received by the holder 50 in the battery from the first terminal 30 and the direction of the reaction force F2 received by the holder 50 in the battery from the second terminal 40 are opposite to each other, whereby the reaction forces F1 and F2 are likely to offset each other. As a result, the structural reliability of the current collectors and the exterior body in the battery pack can be improved. The battery pack may include a restraining member (not illustrated) which restrains the plurality of secondary batteries 100. As a result, the interfacial resistance in the electrode laminate 20 can be reduced, whereby a high-performance battery pack can be obtained.

REFERENCE SIGNS LIST

P1 first plane
P2 second plane
P3 third plane
10 exterior body
20 electrode laminate
20a laminate part
20b current collection part
21 electrode body
22 positive electrode current collector
22x first terminal connection part
23 negative electrode current collector
23x second terminal connection part
24 positive electrode active material layer
25 negative electrode active material layer
26 electrolyte layer
27 sealing resin layer
30 first terminal
30a first connection part
30b first crank-shaped part
30c first protrusion
40 second terminal
40a second connection part
40b second crank-shaped part
40c second protrusion
50 holder
100 secondary battery

The invention claimed is:

1. A secondary battery, comprising an exterior body, an electrode laminate, a first terminal, a second terminal, and a holder, wherein the exterior body houses the electrode laminate, the electrode laminate has a laminate part and a current collection part, the laminate part has a plurality of laminated electrode bodies, the current collection part has at least one positive electrode current collector and at least one negative electrode current collector which protrude from the laminate part, the first terminal has a first connection part extending in a first direction, a first protrusion extending in a second direction opposite the first direction, and a first crank-shaped part extending generally normal to the first direction and the second direction, the second terminal has a second connection part and a second protrusion, the first connection part is connected to one of the positive electrode current collector and the negative electrode current collector, the second connection part is connected to the other of the positive electrode current collector and the negative electrode current collector, the first connection part is provided on one lamination direction side of the plurality of electrode bodies with respect to the second connection part, the second connection part is provided on the other lamination direction side of the plurality of electrode bodies with respect to the first connection part, the first crank-shaped part couples the first connection part and the first protrusion, the first crank-shaped part is bent from the first connection part toward the other lamination direction side, the first protrusion and the second protrusion protrude to the outside of the exterior body, the first protrusion and the second protrusion do not face each other in the lamination direction, the first protrusion and the second protrusion are overlapped in the lamination direction, a holder is present between the first connection part and the second connection part, and the holder contacts the first connection part, the second connection part and the first crank-shaped part.

2. The secondary battery according to claim 1, wherein:
the first protrusion is positioned between a first plane orthogonal to the lamination direction and transecting the first connection part and a second plane orthogonal to the lamination direction and transecting the second connection part or the second plane transects the second protrusion,
the second protrusion is positioned between the first plane and the second plane, or the second plane transects the second protrusion, and
the holder contacts the first terminal and the second terminal and supports the first terminal and the second terminal.

3. The secondary battery according to claim 2, wherein:
the second terminal has a second crank-shaped part,
the second crank-shaped part couples the second connection part and the second protrusion,
the second crank-shaped part is bent from the second connection part toward the one lamination direction side,
the first crank-shaped part and the second-crank shaped part do not face each other in the lamination direction, and
the first protrusion and the second protrusion are positioned between the first plane and the second plane.

4. The secondary battery according to claim 1, wherein
the exterior body is composed of a laminate film,
the exterior body comprises a seal part, and
the first protrusion and the second protrusion protrude through the seal part to outside of the exterior body.

5. The secondary battery according to claim 1, wherein
the current collection part has a plurality of the positive electrode current collectors and a plurality of the negative electrode current collectors which protrude from the laminate part,
the plurality of positive electrode current collectors are connected to each other to form a first terminal connection part,
the plurality of negative electrode current collectors are connected to each other to form a second terminal connection part,
the first connection part is connected to one of the first terminal connection part and the second terminal connection part, and
the second connection part is connected to the other of the first terminal connection part and the second terminal connection part.

6. The secondary battery according to claim 1, wherein
at least a part of the first connection part and at least a part of the second connection part face each other in the lamination direction.

7. The secondary battery according to claim 1, wherein when a third plane orthogonal to the lamination direction and transects the first protrusion, the third plane transects the second protrusion.

8. The secondary battery according to claim 1, wherein the holder is provided inside the exterior body between the electrode laminate and an inner surface of the exterior body.

9. The secondary battery according to claim 1, wherein the holder is composed of a thermoplastic resin or a curable resin.

10. The secondary battery according to claim 1, which is an all-solid-state battery.

11. The secondary battery according to claim 1, wherein the first connection part and the first protrusion are spaced from each other in the lamination direction.

12. The secondary battery according to claim 1, wherein the first crank-shaped part is elongated in the lamination direction.

* * * * *